UNITED STATES PATENT OFFICE.

EDWARD J. KINGSBURY, OF NEW YORK, N. Y.

ALLOY FOR ELECTRIC WELDING.

1,350,317.   Specification of Letters Patent.   Patented Aug. 24, 1920.

No Drawing.   Application filed November 20, 1919. Serial No. 339,344.

*To all whom it may concern:*

Be it known that I, EDWARD J. KINGSBURY, a citizen of the United States, residing in the city of New York, borough of Brooklyn, in the county of Kings and State of New York, have invented a certain new and useful Alloy for Electric Welding, of which the following is a specification.

The invention relates to the fusible electrodes or pencils used in joining the parts in arc welding operations, and the object of the invention is to provide an alloy which when fused in the arc will combine with the surfaces to be joined and produce a weld possessing to a high degree the desired qualities of strength, ductility and tenacity.

The invention consists in the metals and materials composing the alloy, and in the proportions of such elements, by which the above objects are attained, and also comprises the electrode or pencil thus composed.

The improved alloy comprises essentially a combination of iron or steel and vanadium. Only a small proportion of vanadium is required to impart the desired qualities to the weld, and my experiments indicate that an alloy of iron or steel with vanadium, and carbon, manganese, phosphorus and sulfur, with a trace of silicon produces the best results.

An alloy containing iron 98.97, carbon .16, manganese .55, vanadium .25, phosphorus .03, sulfur .03, and silicon .01, is believed to be an approximately correct formula for electrodes for general welding operations, but it will be understood that the proportions may be varied and some of the components omitted, or others substituted therefor, as may be found necessary or desirable in producing electrodes adapted for special conditions of work or of electric arc employed.

It is found that the addition of vanadium to the electrode, in passing through the arc, imparts to the weld a remarkable increase in strength without impairing its ductility—a result that can not be attained by any other element used in the composition of the electrode.

I claim:—

1. An electric welding alloy containing iron, carbon, manganese, and vanadium.

2. An electric welding alloy containing iron, carbon, manganese, vanadium, phosphorus, sulfur, and silicon.

3. An electric welding alloy composed of the following elements in approximately the proportions stated:—iron 98.97, carbon .16, manganese .55, vanadium .25. phosphorus .03, sulfur .03, and silicon .01.

4. An electrode for electric welding, consisting of iron, carbon, manganese, and vanadium, in substantially the proportions herein set forth.

In testimony that I claim the invention above set forth I affix my signature, in presence of two witnesses.

EDWARD J. KINGSBURY.

Witnesses:
 EDWARD W. NICHOLS,
 EBEN ROTHERHAM.